US007002606B2

(12) United States Patent
Tanaka et al.

(10) Patent No.: US 7,002,606 B2
(45) Date of Patent: Feb. 21, 2006

(54) IMAGE SIGNAL PROCESSING APPARATUS, IMAGE DISPLAY APPARATUS, MULTIDISPLAY APPARATUS, AND CHROMATICITY ADJUSTMENT METHOD FOR USE IN THE MULTIDISPLAY APPARATUS

(75) Inventors: Teruto Tanaka, Osaka (JP); Atsushi Kokubo, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 226 days.

(21) Appl. No.: 10/088,019

(22) PCT Filed: Jul. 17, 2001

(86) PCT No.: PCT/JP01/06149

§ 371 (c)(1),
(2), (4) Date: Jun. 19, 2002

(87) PCT Pub. No.: WO02/07431

PCT Pub. Date: Jan. 24, 2002

(65) Prior Publication Data

US 2002/0180765 A1 Dec. 5, 2002

(30) Foreign Application Priority Data

Jul. 17, 2000 (JP) ............................. 2000-215517

(51) Int. Cl.
*G09G 5/02* (2006.01)
*G09G 3/28* (2006.01)
(52) U.S. Cl. ........................... 345/690; 345/88; 345/89
(58) Field of Classification Search ................ 345/690, 345/691, 581, 590, 597, 88, 89; 348/602, 348/658
See application file for complete search history.

(56) References Cited

U.S. PATENT DOCUMENTS

| 5,396,257 | A | | 3/1995 | Someya et al. |
| 5,510,851 | A | * | 4/1996 | Foley et al. ................. 348/658 |
| 6,020,868 | A | | 2/2000 | Greene et al. |
| 6,075,514 | A | * | 6/2000 | Ryan .......................... 345/601 |
| 6,351,557 | B1 | * | 2/2002 | Gonsalves .................. 382/167 |
| 6,356,277 | B1 | * | 3/2002 | Yajima et al. .............. 345/603 |

FOREIGN PATENT DOCUMENTS

| EP | 0 989 757 A1 | 3/2000 |
| EP | 1 039 749 A1 | 9/2000 |
| JP | 6-332439 | 12/1994 |
| JP | 7-64522 | 3/1995 |
| JP | 7-333760 | 12/1995 |
| JP | 2000-59806 | 2/2000 |
| WO | WO 00/18139 | 3/2000 |

* cited by examiner

*Primary Examiner*—Amr A. Awad

(57) ABSTRACT

A multidisplay apparatus for distributing image signals for one screen to image display units, allowing the image display units to display a plurality of images side by side on the screen. The multidisplay apparatus includes a plurality of chromaticity adjustment units which respectively correspond to the plurality of image display units and each perform a calculation using signal values of one of the plurality of color image signals to be input to a corresponding image display unit and adjust the chromaticity of an image to be displayed by the corresponding image display unit for each of primary colors red, green, and blue, separately. This enables the images displayed by the image display units to have the same chromaticity, eliminates the color discontinuity between adjacent display images, and provides a sense of togetherness.

16 Claims, 9 Drawing Sheets

IMAGE SIGNAL PROCESSING APPARATUS, IMAGE DISPLAY APPARATUS, MULTIDISPLAY APPARATUS, AND CHROMATICITY ADJUSTMENT METHOD FOR USE IN THE MULTIDISPLAY APPARATUS

TECHNICAL FIELD

The present invention relates to an image signal processing apparatus used as a preprocessing apparatus for an image display apparatus, an image display apparatus containing the preprocessing apparatus, a multidisplay apparatus, and a chromaticity adjustment method for use in the multidisplay apparatus.

BACKGROUND ART

In recent years, large-size screens are often used in concerts or events for visual effects. In typical cases, a multidisplay apparatus that allows a plurality of image display apparatuses to display a plurality of images side by side on a screen is used.

Such a multidisplay apparatus is required to assure the continuity of the plurality of images so that viewers do not feel a sense of inconsistency between the displayed images. Normal image display apparatuses have a function to adjust the brightness, white balance, hue, saturation or the like of the displayed images. Conventional techniques adjust any of the above characteristics as necessary to uniform the color reproduction in the displayed images and assure the continuity of the plurality of adjacent images (hereinafter referred to as "color continuity").

However, the above method for adjusting the brightness, white balance, hue, saturation is not enough to obtain the perfect continuity of the images on the screen. This is because variations inevitably result among display devices and other optical devices such as the liquid crystal display devices, color prisms, color filters, lamps, phosphors or the like in the plurality of image display apparatuses, in terms of the color reproduction, luminescence characteristics, transmission characteristics or the like. This results in difference in the chromaticity between the images, rendering the displayed images discontinuous, and giving the audience an impression of a patchwork.

Conventionally, there is only one technique to solve the above problem. In this technique, image display apparatuses that display such images as have close chromaticity values to each other are selected among a plurality of image display apparatuses, and the selected apparatuses are arranged to be adjacent to each other. However, there is no guarantee that the plurality of image display apparatuses include such apparatuses providing similar chromaticity values, and even if they include, the chromaticity values do not perfectly match. This has kept the above-stated problem that the discontinuity of the images in color reproduction arises and impairs the unity of the images as a whole, unsolved.

It is therefore the object of the present invention to provide an image signal processing apparatus for achieving the unity of the displayed images as a whole by allowing a plurality of displayed images to have substantially the same chromaticity, an image display apparatus containing the image signal processing apparatus, a multidisplay apparatus, and a chromaticity adjustment method for use in the multidisplay apparatus.

DISCLOSURE OF THE INVENTION

The above object can be achieved by an image signal processing apparatus for use as a preprocessing apparatus for an image display apparatus that displays images in accordance with color image signals, comprising: an image signal receiving means for receiving a color image signal; and a chromaticity adjustment means for performing a calculation using signal values of the received color image signal and adjusting the chromaticity of an image to be displayed by the image display apparatus for each of primary colors red, green, and blue, separately.

The above object can also be achieved by an image display apparatus, comprising: an image signal preprocessing means for preprocessing a color image signal; and an image display means for displaying images in accordance with the preprocessed color image signal, wherein the image signal preprocessing means includes an image signal receiving means for receiving the color image signal, and a chromaticity adjustment means for performing a calculation using signal values of the received color image signal and adjusting the chromaticity of an image to be displayed by the image display apparatus for each of primary colors red, green, and blue, separately.

With the above construction, a calculation is performed on a received color image signal such as a RGB signal or a YUV signal, and the chromaticity of displayed images is adjusted for each of red, green, and blue, separately. This enables the chromaticity of displayed images to be adjusted within an available display range of the image display apparatus.

The above object can also be achieved by a multidisplay apparatus for allowing a plurality of image display units to display a plurality of images side by side on a screen, comprising: an image distribution means for generating, from a received color image signal, a plurality of color image signals for a plurality of images to be displayed respectively by the plurality of image display units; and a plurality of chromaticity adjustment means which respectively correspond to the plurality of image display units and each perform a calculation using signal values of one of the plurality of color image signals to be input to a corresponding image display unit and adjust the chromaticity of an image to be displayed by the corresponding image display unit for each of primary colors red, green, and blue, separately.

With the above construction, each chromaticity adjustment means can adjust the chromaticity of displayed images for each of red, green, and blue, separately. This enables images displayed by display units to have substantially the same chromaticity, giving the continuity of the displayed images in terms of color reproduction and making the viewers feel a sense of togetherness of the images.

The above object can also be achieved by a chromaticity adjustment method for adjusting the chromaticity of images displayed by a multidisplay apparatus that allows a plurality of image display units to display a plurality of images side by side on a screen, the multidisplay apparatus including a plurality of chromaticity adjustment means which respectively correspond to the plurality of image display units and each receive a parameter, perform a calculation using signal values of a color image signal in accordance with the received parameter, and adjust the chromaticity of an image to be displayed by a corresponding image display unit for each of primary colors red, green, and blue, separately, the chromaticity adjustment method comprising: a first step for inputting an image signal to each image display unit for each of primary colors red, green, and blue, allowing each image display unit to display an image, and measuring the chromaticity and the brightness of the image displayed by each image display unit for each primary color; and a second step for determining, in accordance with measured values of the chromaticity and the brightness, the parameters to be respectively input to the plurality of chromaticity adjustment means so that chromaticity values of the images displayed by the plurality of image display units are substantially equal to each other for each primary color.

With the above method, each chromaticity adjustment means can appropriately adjust the chromaticity of displayed images for each of red, green, and blue. This enables images displayed by display units to have substantially the same chromaticity, giving the continuity of the displayed images as a whole.

BEST MODE FOR CARRYING OUT THE INVENTION

The following describes a multidisplay apparatus 1 that is an embodiment of the present invention, with reference to the attached figures.

Embodiment 1

(1) Construction of Multidisplay Apparatus 1

Figure 1:
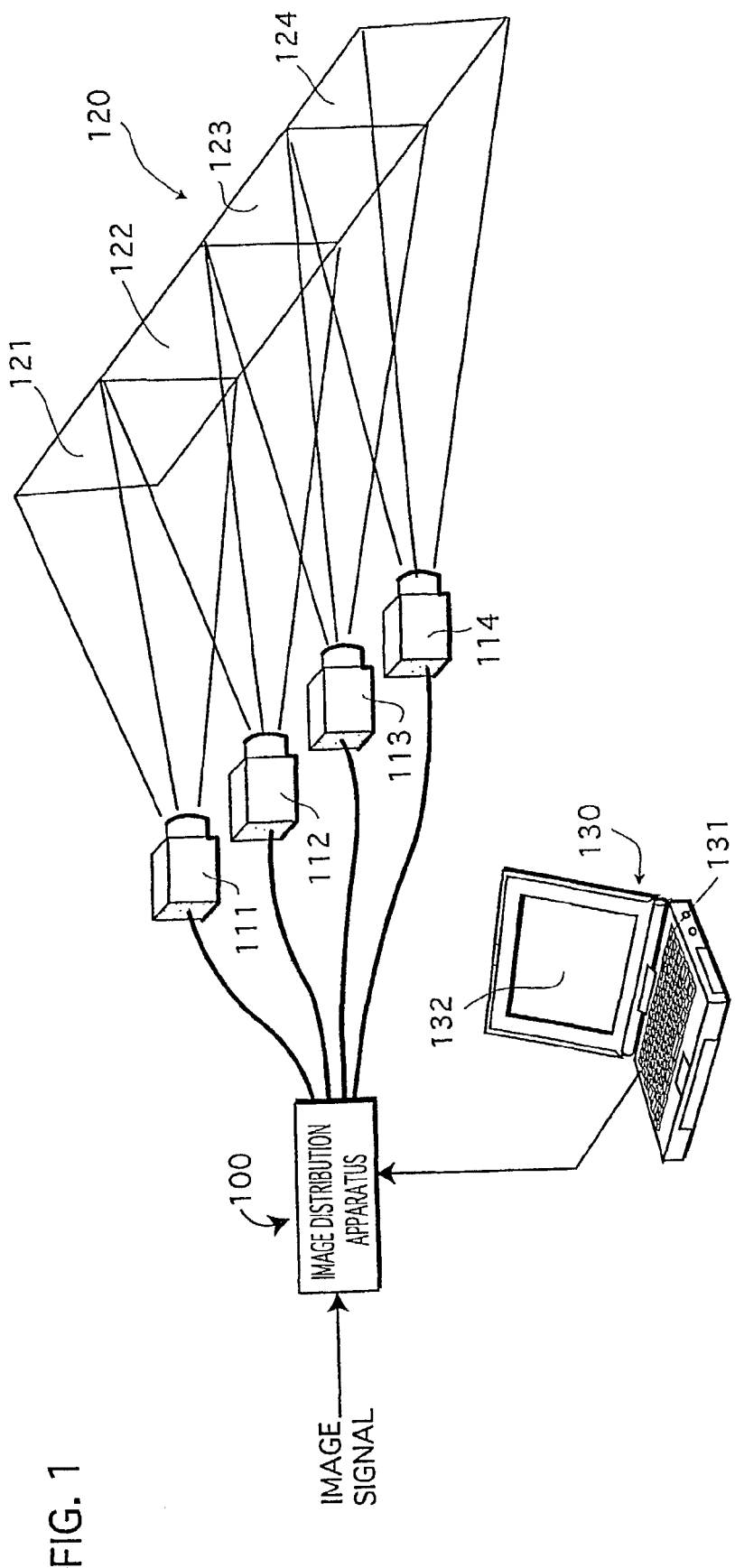
FIG. 1 shows the construction of the multidisplay apparatus in Embodiment 1 of the present invention.

FIG. 1 shows the construction of the multidisplay apparatus 1. In the present embodiment, the multidisplay apparatus 1 is composed of an image distribution apparatus 100 and four liquid crystal projectors 111 to 114.

The image distribution apparatus 100 divides an image signal, which is received from a videocassette recorder or a personal computer and corresponds to one screen, into four that respectively correspond to four screens of the liquid crystal projectors 111 to 114, exercise a predetermined chromaticity adjustment on each of the four image signals, then outputs the four image signals to the liquid crystal projectors 111 to 114, respectively.

The liquid crystal projectors 111 to 114 are based on a known technique. That is to say, each projector forms an image on a translucent liquid crystal display device in accordance with an input image signal, emits light from a light source so as to transmit through the device, and projects the transmitted light on a screen via a projection lens. The liquid crystal projectors 111 to 114 are disposed so that display images 121 to 124 are projected on the horizontally extended screen in a row at the same magnification.

A notebook personal computer 130 is used for chromaticity adjustment that is exercised when, for example, the multidisplay apparatus 1 is set up. The notebook personal computer 130 is programmed to receive a given value from an input unit 131, use the received value to obtain a parameter for chromaticity adjustment so that the display images 121 to 124 have the same chromaticity reproduction to provide a sense of togetherness, and transmit the obtained parameter to the image distribution apparatus 100. On a display unit 132, a message that urges an operator to input, a result of a calculation for obtaining the parameter or the like is displayed. A specific method of obtaining the parameter for chromaticity adjustment will be described later.

(2) Construction of Image Distribution Apparatus 100

Figure 2:
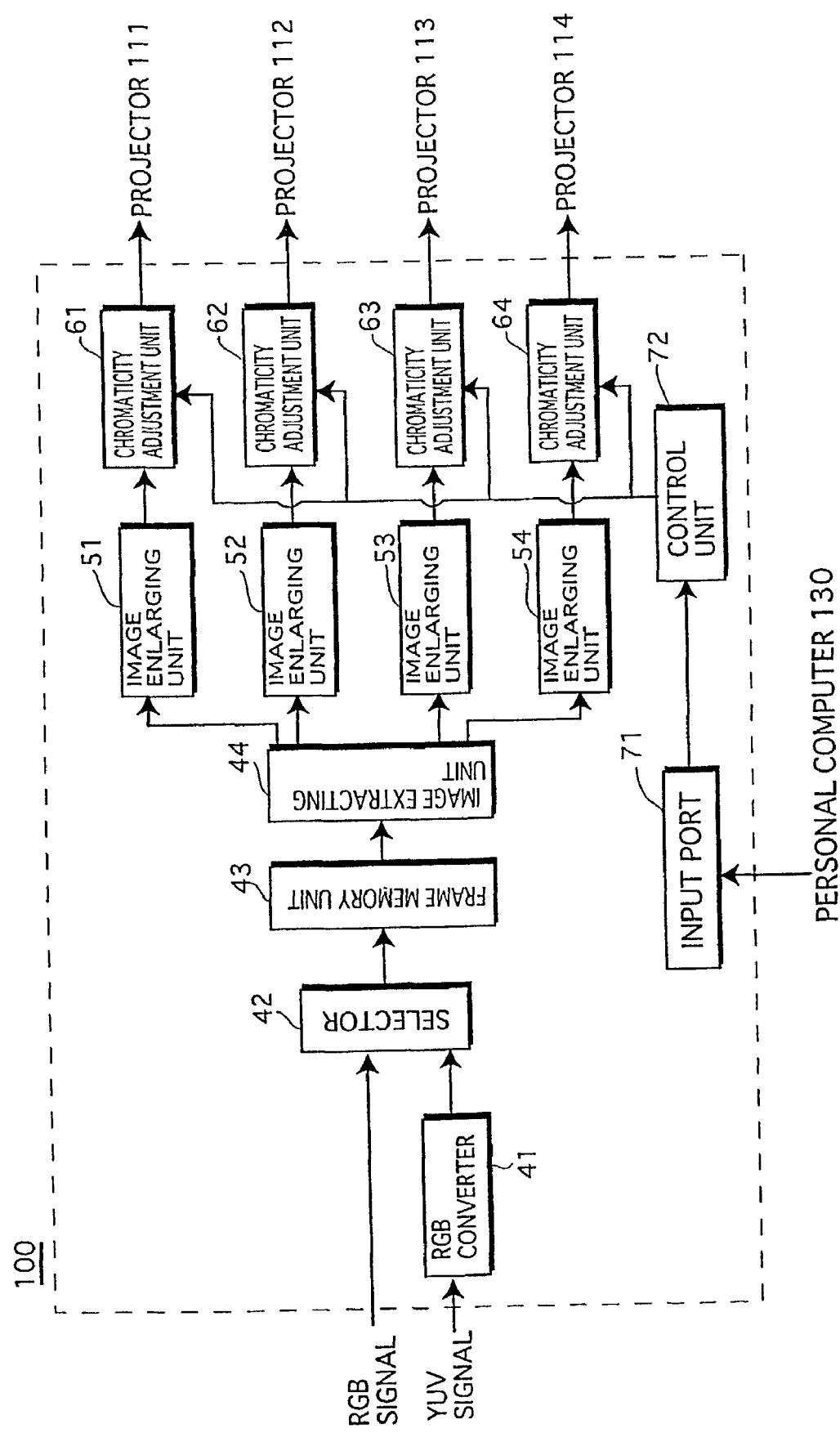
FIG. 2 is a block diagram showing the construction of the image distribution apparatus.

FIG. 2 is a block diagram showing the construction of the image distribution apparatus 100.

As shown in FIG. 2, the image distribution apparatus 100 includes an RGB converter 41, a selector 42, a frame memory unit 43, an image extracting unit 44, image enlarging units 51–54, chromaticity adjustment units 61–64, an input port 71, and an adjustment unit 72.

When a bright/color-difference signal (YUV signal) is received from outside as an image signal, the received signal is converted into an RGB signal by the RGB converter 41, then transmitted to the selector 42. The RGB converter 41 is composed of a known matrix operation circuit, and performs an operation using Equation 1 shown below to convert a YUV signal into an RGB signal.

$$\begin{bmatrix} R \\ G \\ B \end{bmatrix} = \begin{bmatrix} C1 & C2 & C3 \\ C4 & C5 & C6 \\ C7 & C8 & C9 \end{bmatrix} \begin{bmatrix} Y \\ U \\ V \end{bmatrix} \quad \text{Equation 1}$$

In the above equation, C1 to C9 are known coefficients used to convert a YUV signal into an RGB signal.

The selector 42 selects either an input RGB signal or an input YUV signal, and sends the selected signal to the frame memory unit 43. The selection by the selector 42 is set by a manual operation of the operator. Note that the selector 42 may detect an input terminal through which a signal has been input, and automatically be switched to a port corresponding to the detected input terminal.

The frame memory unit 43 includes three frame memories corresponding to R (Red), G (Green), and B (Blue), respectively. Each frame memory stores image signal values equivalent to one screen.

The image extracting unit 44 divides one screen of the image signal values stored for each color in the frame memory unit 43 into four groups so that the output screen is equally divided into four in a row, extracts the groups of values, and sends them to the image enlarging units 51 to 54, respectively in order.

The image enlarging units 51 to 54 enlarge the respective images extracted by the image extracting unit 44 by interpolating signals between each pixel for each of R, G, B, and increasing the number of pixels so that the display images 121 to 124 are displayed with an appropriate resolution. More particularly, the image enlarging units 51 to 54 use a resize LSI.

The signals of the images enlarged by the image enlarging units 51 to 54 are sent to the chromaticity adjustment units 61–64, respectively, where a chromaticity conversion process is performed on image signals for each of R, G, and B.

Figure 3:
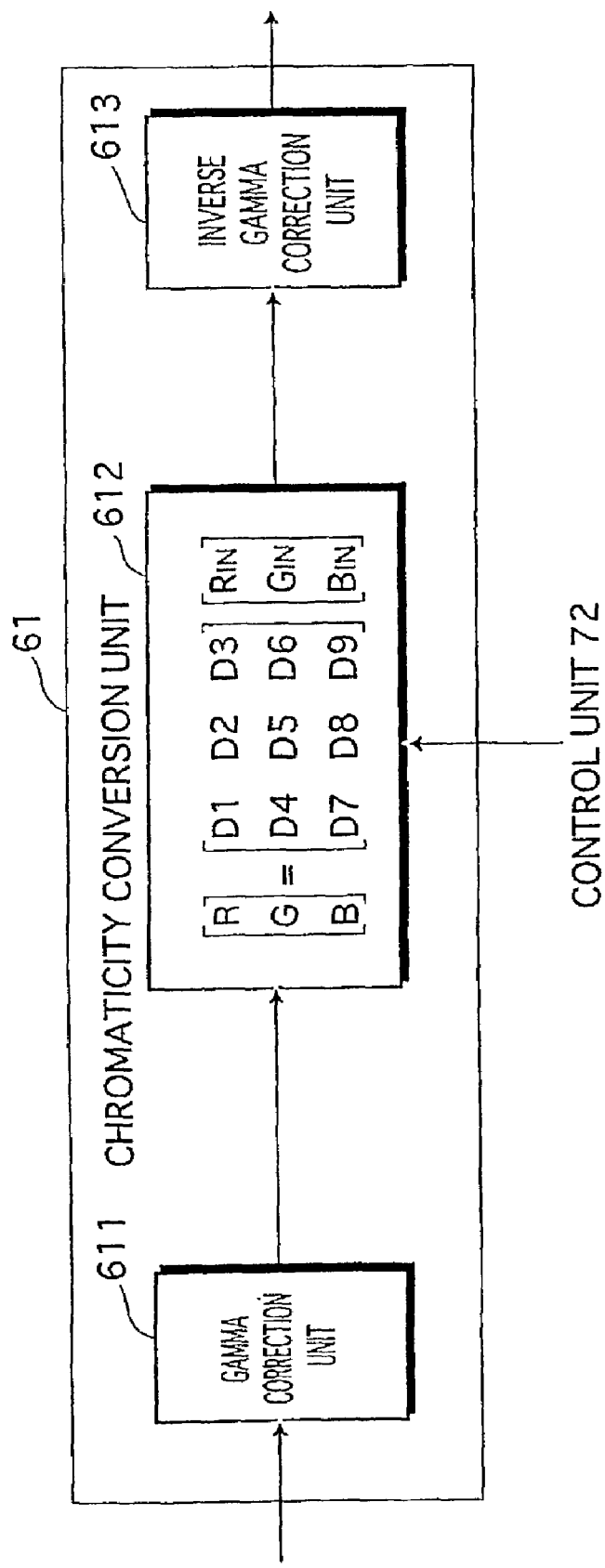
FIG. 3 is a block diagram showing the construction of the chromaticity adjustment unit in the image distribution apparatus.

FIG. 3 is a block diagram showing the construction of the chromaticity adjustment unit 61. As shown in FIG. 3, the chromaticity adjustment unit 61 is composed of a gamma correction unit 611, a chromaticity conversion unit 612, and an inverse gamma correction unit 613.

The gamma correction is performed to correct the nonlinearity between the gradation of input signals and the gradation of display images. The gamma correction unit 611 has a table for each of R, G, and B (hereinafter referred to as gradation conversion table) showing gradation conversion characteristics for correcting the nonlinearity. The gamma correction unit 611 executes the gamma correction for each color referring to the table.

In general, a gamma correction circuit used for the gamma correction is embedded in each image display apparatus (in the present embodiment, each liquid crystal projector). The reason why in the present embodiment the image distribution apparatus 100 further executes the gamma correction is that it provides more accurate chromaticity correction for the display images by executing the chromaticity correction on signal values corresponding to the beams of light emitted from image display apparatuses.

With the above-stated construction, it is desired that the gradation conversion characteristics of the gamma correction unit 611 are approximately equal to those of the gamma correction circuit mounted on the image display apparatus connected thereto.

The chromaticity conversion unit 612 performs chromaticity conversion on the image signals for each of R, G, and B having been subjected to the gamma correction. Specifically, the chromaticity conversion unit 612 is composed of a matrix operation circuit, and converts the chromaticity for each of R, G, and B by multiplying input RGB signals (Rin, Gin, and Bin) with a 3×3 square matrix, as shown in the following Equation 2.

$$\begin{bmatrix} R \\ G \\ B \end{bmatrix} = \begin{bmatrix} D1 & D2 & D3 \\ D4 & D5 & D6 \\ D7 & D8 & D9 \end{bmatrix} \begin{bmatrix} R_{IN} \\ G_{IN} \\ B_{IN} \end{bmatrix} \quad \text{Equation 2}$$

The values for parameters D1 to D9 in the square matrix are changed under control of the control unit 72. This enables the chromaticity for each of R, G, and B to be changed separately.

It should be noted here that the matrix operation circuit itself is a known circuit composed of a plurality of multipliers and adders, and the matrix operation circuit executes the multiplication shown in Equation 2 by controlling multiplication coefficients (the parameters D1 to D9) in each multiplier.

The RGB signals having been subjected to the chromaticity conversion by the chromaticity conversion unit 612 are then subjected to inverse gamma correction by the inverse gamma correction unit 613. The inverse gamma correction is performed to avoid a gamma correction unit in the liquid crystal projector 111 from executing a gamma correction doubly on the signals having already been subjected to a gamma correction. The double gamma correction may deteriorate the color tone of the images to be reproduced.

The chromaticity adjustment units 62 to 64 have the same construction as the chromaticity adjustment unit 61. The parameters D1 to D9 in each matrix operation circuit of these units are separately controlled by the control unit 72. The values for each parameter are properly determined as follows so that the liquid crystal projectors 111 to 114 can display images having the same chromaticity.

(3) Method of Determining Parameters D1 to D9

Now, a method of determining the parameters D1 to D9 in the matrix operation circuit of the chromaticity adjustment units 61 to 64 will be described.

Figure 4:
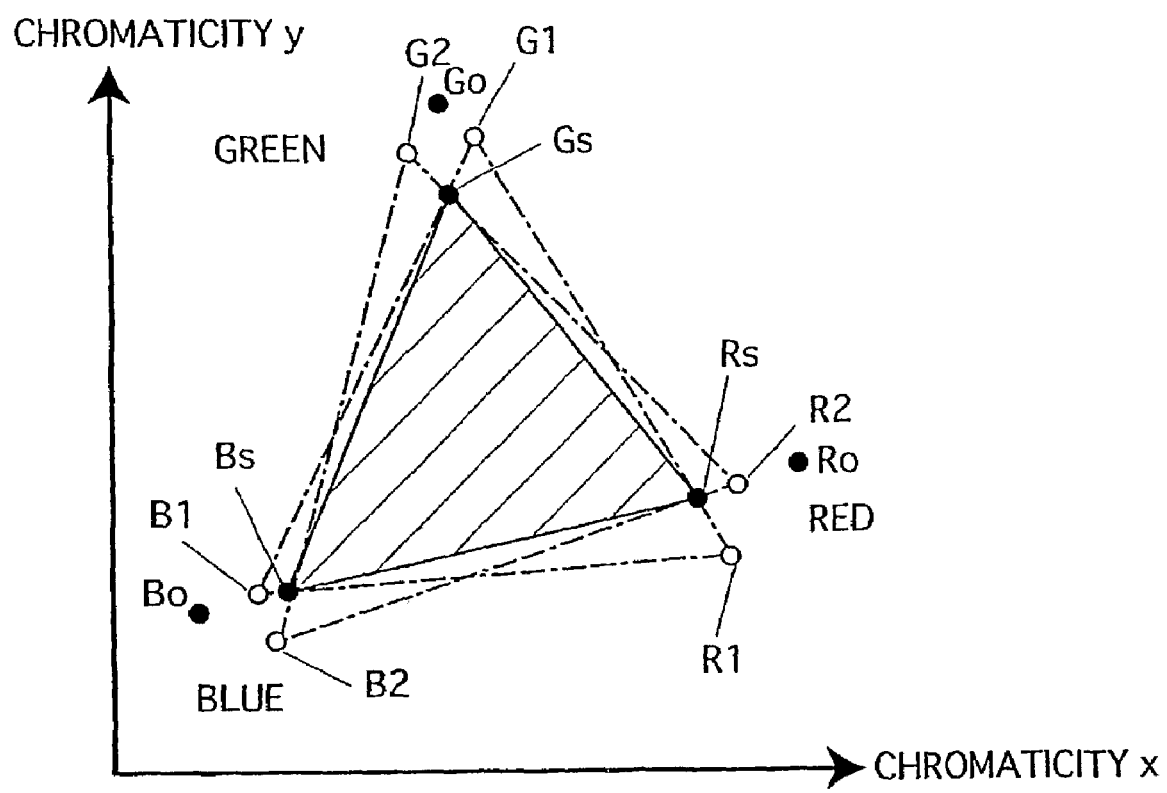
FIG. 4 shows a method for obtaining the common chromaticity range when two liquid crystal projectors are used.

FIG. 4 is a plot on the chromaticity coordinates of chromaticity y and chromaticity x measured for each of R, G, and B on display images projected on the screen by two liquid crystal projectors.

In the first stage, the personal computer 130 or the like inputs only an image signal value for R into the image distribution apparatus 100 so that the two projectors can project images onto the screen. The input signal value for R corresponds to the highest brightness (i.e., when the image signals for R are represented by 256 gradations of "0" to "255", "255" is input as the image signal value for R. This also applies to the other colors).

The chromaticity and brightness on the red images projected on the screen 120 by the liquid crystal projectors 111 and 112 are measured using a known colorimeter to obtain the chromaticity values x and y and brightness values. The points R1 and R2, corresponding to liquid crystal projectors 111 and 112 respectively, represent plots of chromaticity x and y obtained in this way. This also applies to the other colors.

Similarly, image signal values for G and B are input into the image distribution apparatus 100 in sequence, the chromaticity and brightness on the display images are measured, and the chromaticity values x and y are plotted on the chromaticity coordinates as G1, G2, B1, and B2. Hereinafter, the plots of chromaticity x and y on the chromaticity coordinates are referred to as chromaticity coordinate points, for the sake of conveniences. Since every color is represented as a combination of the three primary colors RGB, the triangles ΔR1G1B1 and ΔR2G2B2 indicate ranges of chromaticity that can be displayed by the liquid crystal projectors 111 and 112, respectively.

One way to have the images displayed by the liquid crystal projectors 111 and 112 have the same chromaticity is to change the parameters in at least one chromaticity adjustment unit corresponding to either of the liquid crystal projectors 111 and 112 so that the chromaticity ranges ΔR1G1B1 and ΔR2G2B2 completely overlap one another.

For achieving the above, chromaticity coordinate points Rs, Gs, and Bs selected from a portion (hereinafter referred to as common chromaticity range) common to ΔR1G1B1 and ΔR2G2B2 are first set. Each chromaticity adjustment unit then adjusts the chromaticity so that each of ΔR1G1B1 and ΔR2G2B2 completely overlaps with ΔRsGsBs. During this process, it is desirable that chromaticity coordinate points satisfying the following conditions are determined as the chromaticity coordinate points Rs, Gs, and Bs.

Condition 1

To reproduce an image with as close a tone as possible to the original image, the hue of the image after the chromaticity conversion should deviate from a standard level as little as possible.

Condition 2

In addition to Condition 1, as large a color reproduction range as possible should be set.

To achieve the above, in the present embodiment, standard chromaticity coordinate points for RGB (R0, G0, and B0 shown in FIG. 4) are first plotted on the chromaticity coordinates. Then, points that are on the border of the common chromaticity range and are closest to the standard chromaticity coordinate points R0, G0, and B0 are determined as the chromaticity coordinate points Rs, Gs, and Bs, respectively. Such points satisfy Condition 1 since they are closest to the standard chromaticity coordinate points R0, G0, and B0, and also satisfy Condition 2 since they are on the border of the common chromaticity range. In FIG. 4, such points satisfying both Conditions 1 and 2 are the chromaticity coordinate points Rs, Gs, and Bs that are intersection points of the borders of the chromaticity ranges ΔR1G1B1 and ΔR2G2B2.

Note that the standard chromaticity coordinate points R0, G0, and B0 on display images for the three primary colors RGB are obtained empirically.

Figure 5:
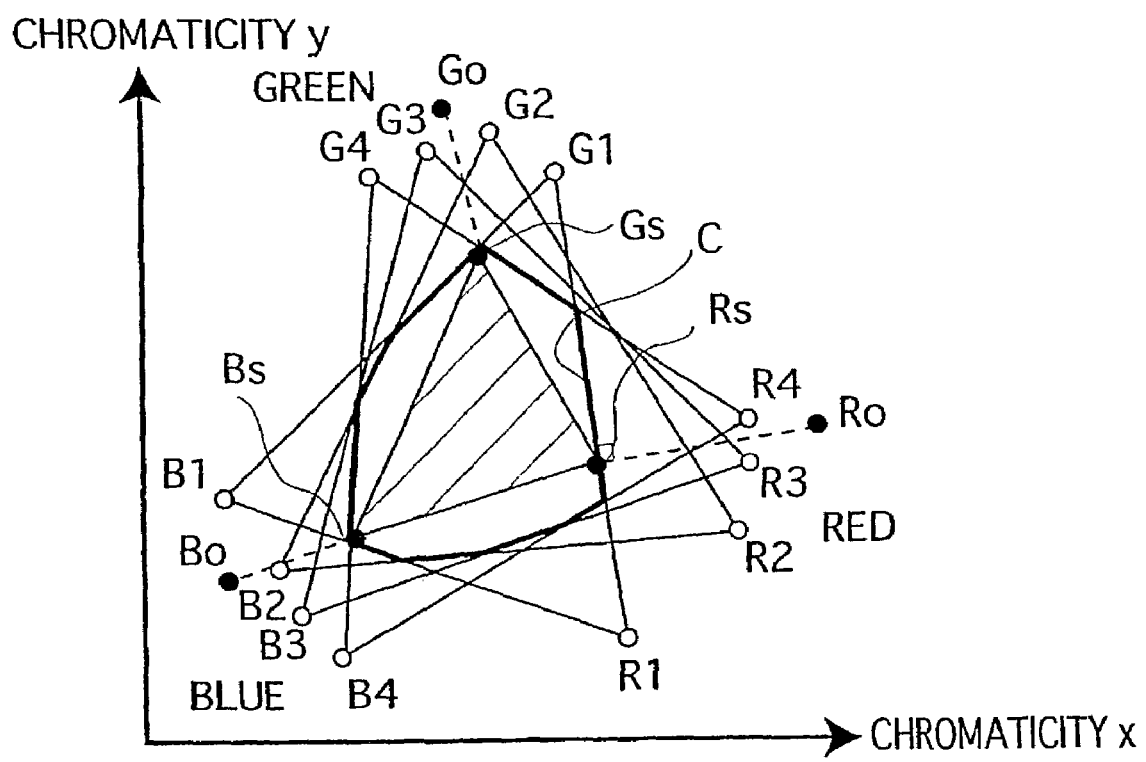
FIG. 5 shows a method for obtaining the common chromaticity range when four liquid crystal projectors are used.

In the present embodiment, four liquid crystal projectors are used. As a result, chromaticity range ΔRiGiBi (i=1, 2, 3, 4) that can be displayed by each of 25 the four liquid crystal projectors is first obtained, as shown in FIG. 5. Then, the common chromaticity range of these chromaticity ranges is obtained (in FIG. 5, a thick line represents the border of the common chromaticity range). Then, as shown in FIG. 5, points that are on the border of the common chromaticity range and are closest to the standard chromaticity coordinate points R0, G0, and B0 are determined as the target chromaticity coordinate points Rs, Gs, and Bs, respectively.

It should be noted here that in the case where five or more liquid crystal projectors are used, the target chromaticity coordinate points can be obtained using the above method.

Now, a method of obtaining parameters D1 to D9 to have the three primary colors of the image displayed by the liquid crystal projector 111 have the same chromaticity as the target chromaticity coordinate points Rs, Gs, and Bs will be described.

Here, the chromaticity coordinates x and y of the chromaticity coordinate point R1 for red before the chromaticity adjustment by the liquid crystal projector 111 are represented as Xra and Yra, respectively (hereinafter, the chromaticity coordinates x and y are referred to as chromaticity coordinates (Xra, Yra). This applies to the other colors G and B). Also, the brightness at the chromaticity coordinate point R1 is represented as Kra. Similarly, the chromaticity coordinates of the chromaticity coordinate point G1 for green before the chromaticity adjustment are represented as (Xga, Yga), and the brightness is represented as Kga; the chromaticity coordinates of the chromaticity coordinate point B1 for blue before the chromaticity adjustment are represented as (Xba, Yba), and the brightness is represented as Kba.

Also, the chromaticity coordinates of the chromaticity coordinate points Rs, Gs, and Bs being the target of the chromaticity adjustment for the three primary colors are represented as (Xrt, Yrt), (Xgt, Ygt), and (Xbt, Ybt), respectively, and the brightness is represented as Krt, Kgt, and Kbt. It should be noted here that the brightness Krt, Kgt, and Kbt should be able to be displayed by any of the liquid crystal projectors 111 to 114. Therefore, the lowest value among the measured brightness values for each projector and for each of G, R, and B is used as Krt, Kgt, or Kbt.

By the principle of the additive mixture of color stimuli, the relationships between the chromaticity and brightness for each color before the chromaticity adjustment by the liquid crystal projector 111 and the chromaticity and brightness for each color in the targets are represented by the following Equations 3 to 11.

$$Xrt = \frac{\frac{Xrax(KraxD1)}{Yra} + \frac{Xgax(KgaxD4)}{Yga} + \frac{Xbax(KbaxD7)}{Yba}}{\frac{KraxD1}{Yra} + \frac{KgaxD4}{Yga} + \frac{KbaxD7}{Yba}} \quad \text{Equation 3}$$

$$Yrt = \frac{(KraxD1) + (KgaxD4) + (KbaxD7)}{\frac{KraxD1}{Yra} + \frac{KgaxD4}{Yga} + \frac{KbaxD7}{Yba}} \quad \text{Equation 4}$$

$$Krt = (KraxD1) + (KgaxD4) + (KbaxD7) \quad \text{Equation 5}$$

$$Xgt = \frac{\frac{Xrax(KraxD2)}{Yra} + \frac{Xgax(KgaxD5)}{Yga} + \frac{Xbax(KbaxD8)}{Yba}}{\frac{KraxD2}{Yra} + \frac{KgaxD5}{Yga} + \frac{KbaxD8}{Yba}} \quad \text{Equation 6}$$

$$Ygt = \frac{(KraxD2) + (KgaxD5) + (KbaxD8)}{\frac{KraxD2}{Yra} + \frac{KgaxD5}{Yga} + \frac{KbaxD8}{Yba}} \quad \text{Equation 7}$$

$$Kgt = (KraxD2) + (KgaxD5) + (KbaxD8) \quad \text{Equation 8}$$

$$Xbt = \frac{\frac{Xrax(KraxD3)}{Yra} + \frac{Xgax(KgaxD6)}{Yga} + \frac{Xbax(KbaxD9)}{Yba}}{\frac{KraxD3}{Yra} + \frac{KgaxD6}{Yga} + \frac{KbaxD9}{Yba}} \quad \text{Equation 9}$$

$$Ybt = \frac{(KraxD3) + (KgaxD6) + (KbaxD9)}{\frac{KraxD3}{Yra} + \frac{KgaxD6}{Yga} + \frac{KbaxD9}{Yba}} \quad \text{Equation 10}$$

$$Kbt = (KraxD3) + (KgaxD6) + (KbaxD9) \quad \text{Equation 11}$$

Accordingly, by solving these simultaneous equations, values for parameters D1 to D9 to be applied to the determinant in the chromaticity adjustment unit 61 corresponding to the liquid crystal projector 111 are obtained.

Similarly, values for parameters to be set in the chromaticity adjustment unit 62 to 64 corresponding to the liquid crystal projectors 112 to 114 are obtained.

In reality, the operation for obtaining the above parameters is executed by the personal computer 130, and the results are transferred to the control unit 72 via the input port 71 of the image distribution apparatus 100.

The control unit 72 sequentially sets the received parameters in the matrix operation circuits in the chromaticity adjustment units 61 to 64.

As described above, by changing the parameters for each of the chromaticity adjustment units 61 to 64, the chromaticity of the images displayed by the liquid crystal projectors 111 to 114 is adjusted appropriately for each primary color to be equivalent to the chromaticity of the target chromaticity coordinate points Rs, Gs, and Bs. This eliminates the discontinuity in color over the whole screen, and enhances the integrity of the plurality of images displayed on the screen. This enables realistic images to be displayed without causing the viewers to feel a sense of inconsistency between the displayed images.

Figure 6:
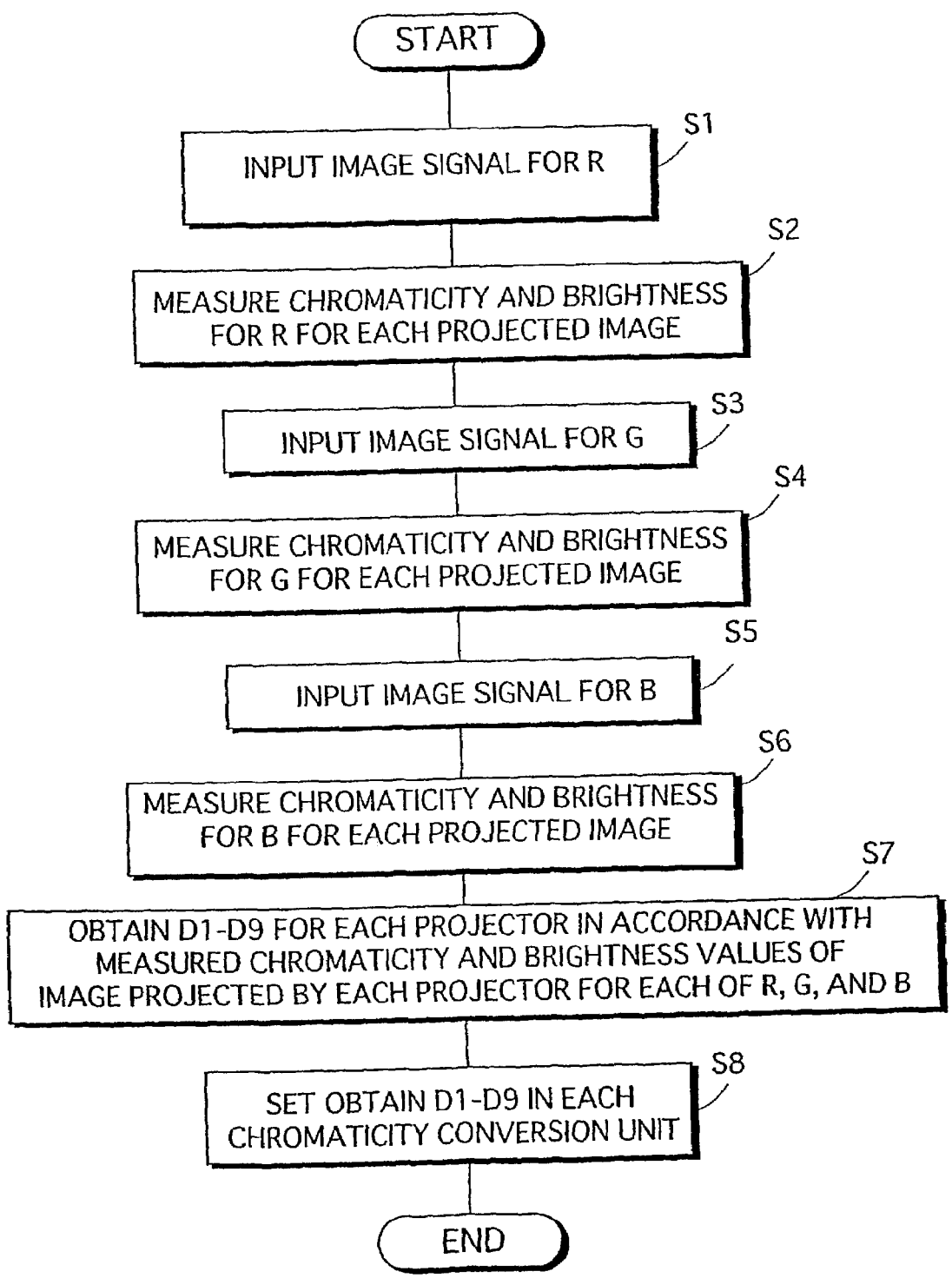
FIG. 6 is a flowchart of the procedure of determining the parameters in Embodiment 1 of the present invention.

FIG. 6 is a flowchart of the procedure of determining the parameters for the chromaticity adjustment.

First, an image signal for R is input to the image distribution apparatus 100 to allow the liquid crystal projectors 111 to 114 to project red images (step S1). The chromaticity and brightness are measured for each projected image (step S2). These operations are repeated for each of G and B image signals (steps S3 to S6). The values, obtained through these steps, of the chromaticity and brightness on the projected images for each liquid crystal projector and each primary color are input to the personal computer 130 via the input unit 131.

The personal computer 130 obtains values for parameters D1 to D9 to be set in the chromaticity adjustment units 61 to 64 corresponding to the respective projectors, based on the measured values of chromaticity and brightness of the images projected by liquid crystal projectors 111 to 114 for each primary color (step S7), and transfers the obtained values to the image distribution apparatus 100.

The parameter values transferred to the control unit 72 of the image distribution apparatus 100 are set in the chromaticity adjustment units 61 to 64 (step S8).

Figure 7:
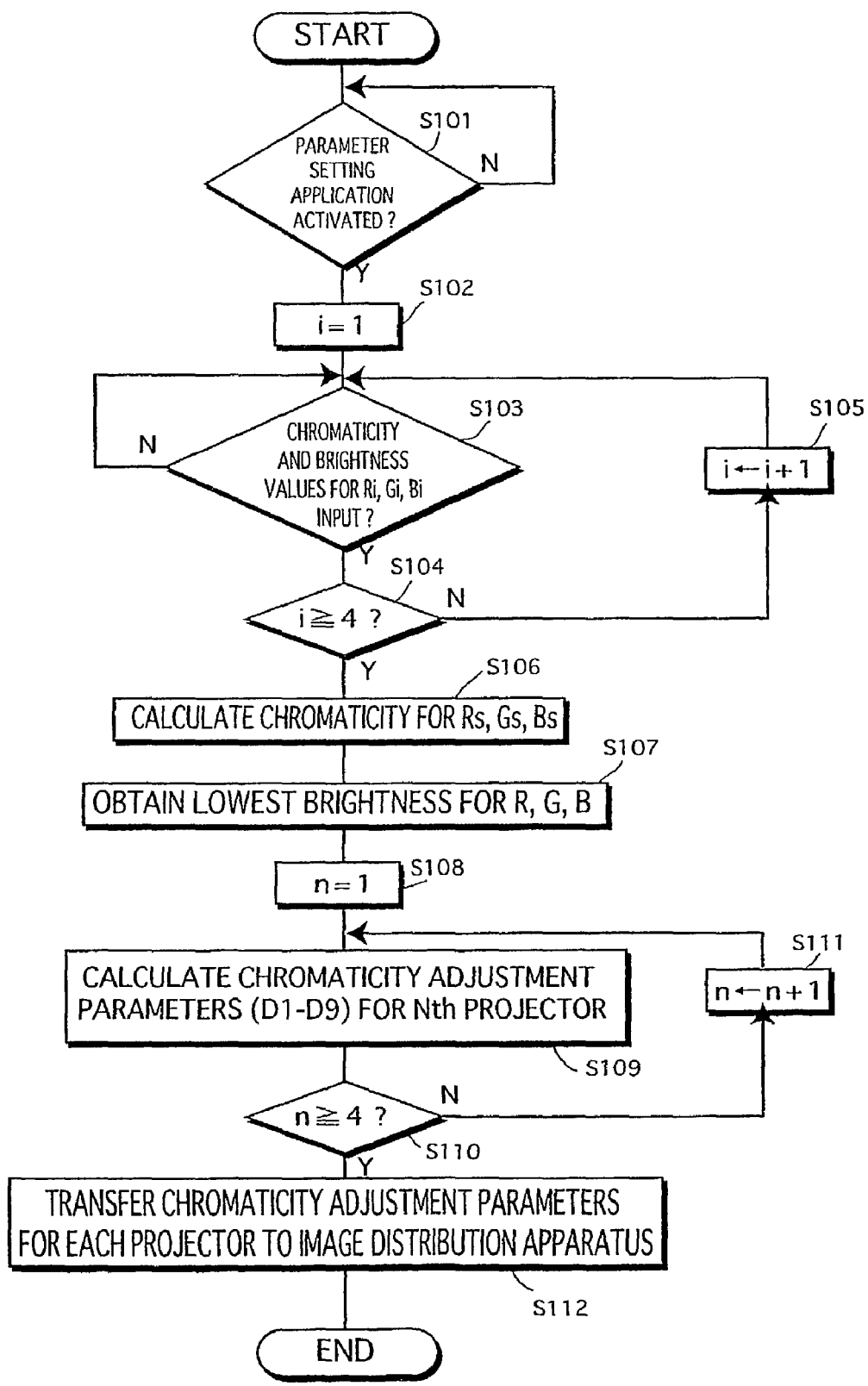
FIG. 7 is a flowchart showing the procedure of parameter calculation process executed by the personal computer.

FIG. 7 is a flowchart showing the procedure of the step S7 executed by the personal computer 130. First, when a parameter setting application installed on the personal computer 130 is activated (judged as Y in step S101), variable i is set to 1 (step S102). It should be noted here that this application has been installed onto the personal computer 130 from a floppy disk attached to the image distribution apparatus 100.

Then, the chromaticity and brightness values for chromaticity coordinate points Ri, Gi, and Bi respectively for R, G, and B on the image projected by the first liquid crystal projector are waited to be input (step S103). When the values are input, it is judged whether "i" is no lower than 4 (step S104). When "i" is lower than 4 (judged as N in step S4), control goes to step S5 where 1 is added to "i", then step S3 is repeated until it is judged that "i" is 4 (judged as Y in step S4). Since this indicates that all the chromaticity and brightness values for chromaticity coordinate points Ri, Gi, and Bi (i=1, 2, 3, 4) have been input, the chromaticity values x and y for target chromaticity coordinate points Rs, Gs, and Bs are calculated, based on the chromaticity values among the input values.

The following calculation method may be applied to the above calculation procedure. First, equations which represent a plurality of straight lines of the border of the chromaticity range are obtained based on the coordinates of each chromaticity coordinate point for four chromaticity ranges $\Delta RiGiBi$ (i=1, 2, 3, 4. Refer to FIG. 5). Then, intersection points of the borders of different chromaticity ranges are obtained. Intersection points that, when connected with each other in order, contain no border inside are selected from the obtained intersection points. The selected points are connected with each other in order and the border of the common chromaticity range is obtained.

When coordinates of two points are obtained, an equation for obtaining a straight line linking the two points is determined. When such an equation is determined, a distance between the straight line and a given point can be obtained using a formula. Accordingly, distances between each straight line as the border of the common chromaticity range and each of the standard chromaticity coordinate points R0, G0, and B0 can be easily obtained by calculations. After this, such points on the border as render each distance the shortest are set as Rs, Gs, and Bs.

Back to the flowchart, since the measured brightness values for each image projected by the liquid crystal projectors 111 to 114 for each primary color have been input, the brightness values for the same primary color are compared with each other to obtain the lowest brightness for each primary color, and the obtained lowest brightness values are set as Yrt, Ygt, and Ybt (step S107).

Variable n is set to 1 (step S108) The simultaneous equations Equation 3 to 11 are solved and parameters D1 to D9 to be set in the chromaticity adjustment unit corresponding to the nth liquid crystal projector are obtained. This process is repeated until n=4 and all the parameters to be set in the chromaticity adjustment units 61 to 64 have been obtained (steps S110, S111, S109). The obtained parameter values are transferred to the image distribution apparatus 100.

As described above, the personal computer 130 allows parameters to be automatically set and transfers the set parameters via the input port 71. This enables the chromaticity adjustment by each of the liquid crystal projectors 111 to 114 to be easily and speedily executed.

Embodiment 2

In the multidisplay apparatus 1 in Embodiment 1, the chromaticity adjustment unit 61 is embedded in the image distribution apparatus 100. In contrast, in Embodiment 2, the chromaticity adjustment unit 61 is embedded in each liquid crystal projector.

Figure 8:
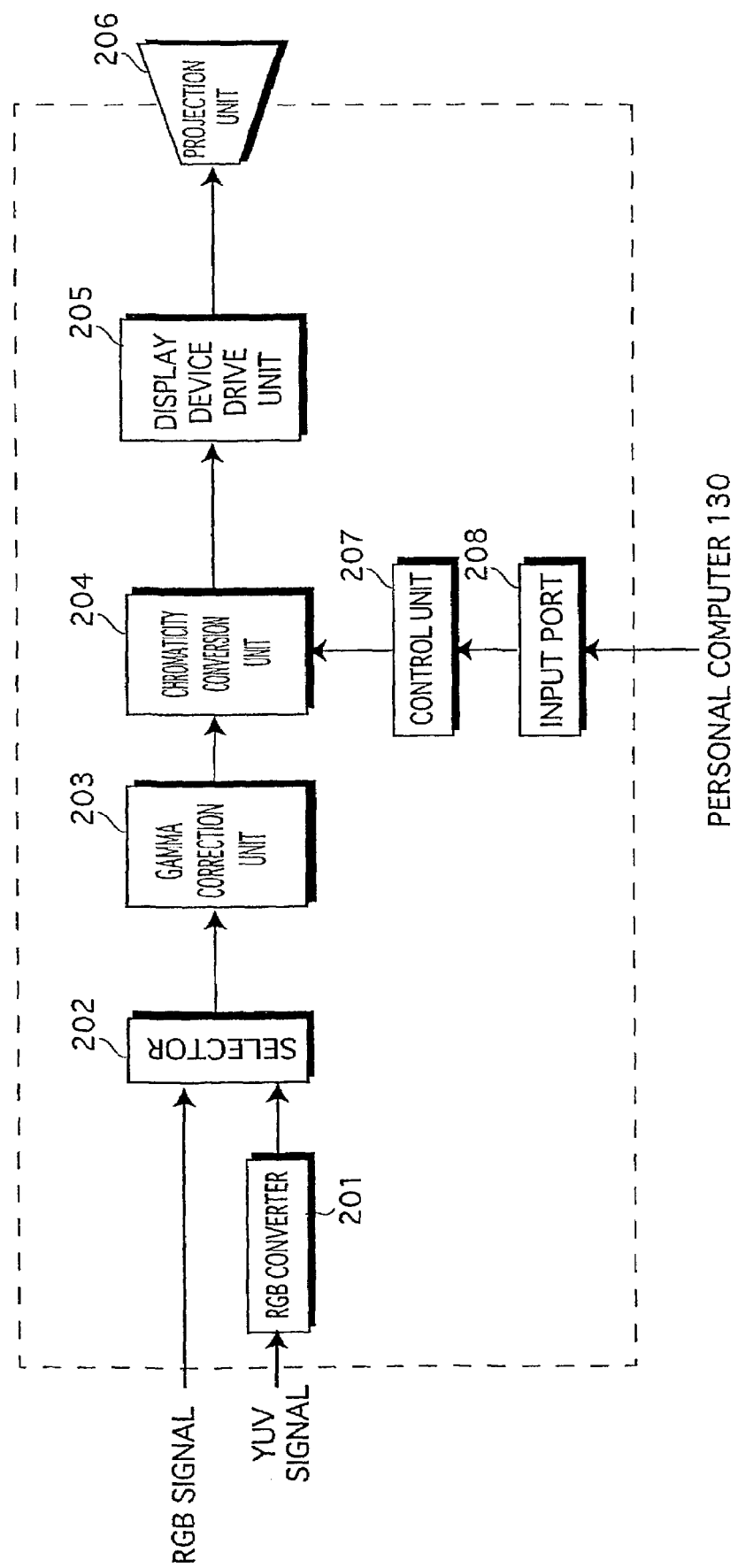
FIG. 8 is a block diagram showing the construction of the liquid crystal projector in Embodiment 2 of the present invention.

FIG. 8 shows a construction of a liquid crystal projector 200.

The liquid crystal projector 200 includes a RGB converter 201 for converting a YUV signal into an RGB signal, a selector 202 for selecting an input signal, a gamma correction unit 203, a chromaticity conversion unit 204 for adjusting the chromaticity of the three primary colors, a display device drive unit 205, a projection unit 206, a control unit 207, and an input port 208.

The image signal selected by the selector 202 is subjected to gamma correction by the gamma correction unit 203 based on the gradation conversion characteristics that have been set in advance to correct the nonlinearity in the gradation reproduction of the projection unit 206.

The chromaticity conversion unit 204 has the same construction as the chromaticity adjustment unit 61, and contains a matrix operation circuit. Values for the parameters D1 to D9 have been given to the control unit 207 from the personal computer 130 via the input port 208. The control unit 207 sets these parameter values in the matrix operation circuit of the chromaticity conversion unit 204.

The chromaticity conversion unit 204 converts the chromaticity of the three primary colors based on the set parameter values, and outputs the converted chromaticity to the display device drive unit 205.

The projection unit 206 is a known one containing a translucent liquid crystal display, a light source, and a projection lens. The display device drive unit 205 drives the liquid crystal display to form projected images, based on the chromaticity-converted RGB signal.

As described above, by installing the chromaticity adjustment function onto the liquid crystal projector, it is possible to achieve the multidisplay apparatus using an already available image distribution apparatus, which contributes to cost reduction. Furthermore, when the liquid crystal projector 200 is equipped with an input unit with which the parameters for chromaticity adjustment can be set manually, the user can tailor the chromaticity of images to the user's liking when using the liquid crystal projector as a discrete device. This is very convenient for users.

Embodiment 3

In the multidisplay apparatus 1 in Embodiment 3, the chromaticity adjustment unit is provided as a discrete chromaticity adjustment apparatus, while in Embodiments 1 and 2, it is embedded in the image distribution apparatus or the liquid crystal projector.

Figure 9:
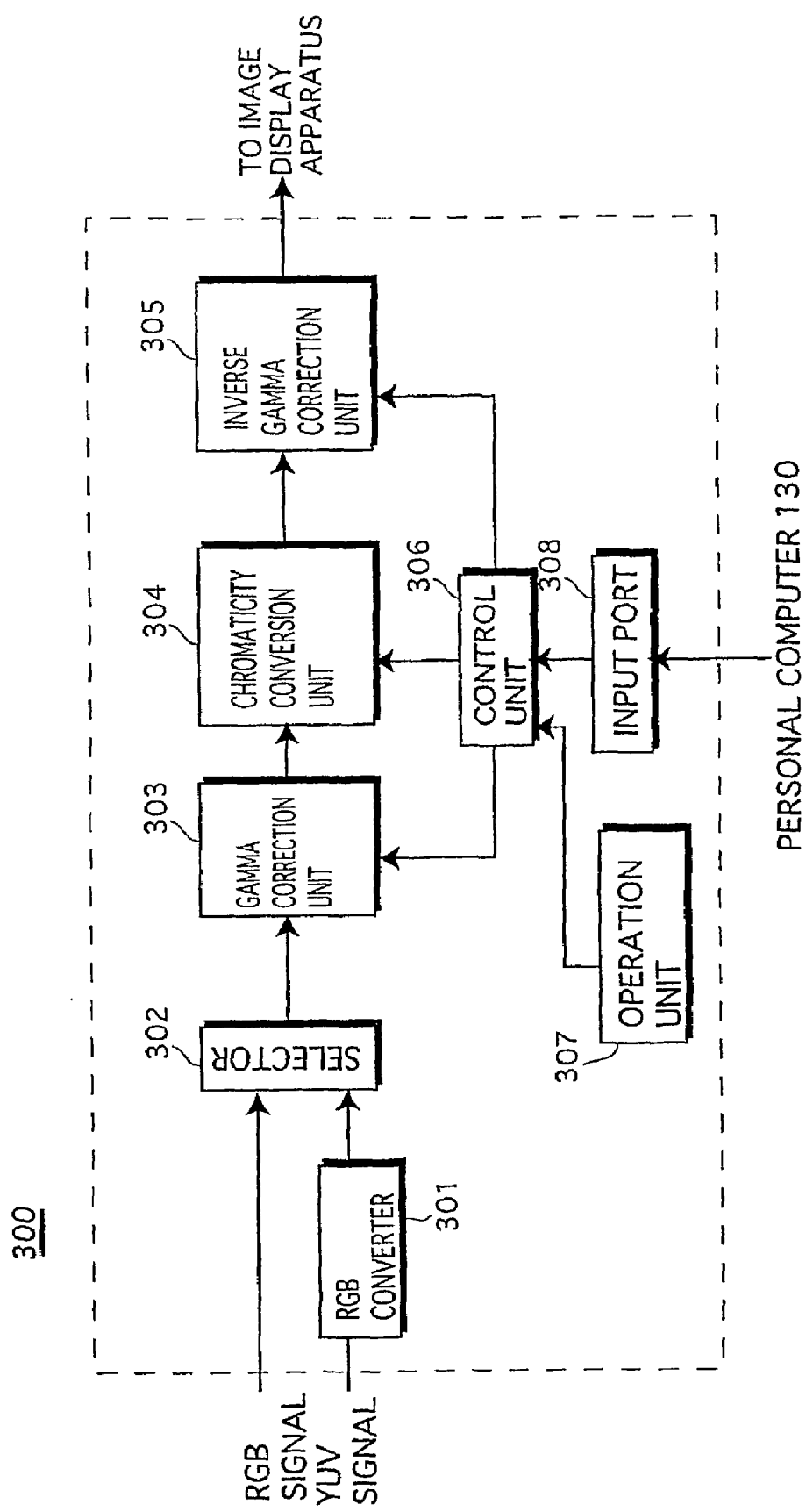
FIG. 9 is a block diagram showing the construction of the chromaticity adjustment apparatus in Embodiment 3 of the present invention.

FIG. 9 is block diagram showing the construction of a chromaticity adjustment apparatus 300 in the present embodiment.

The chromaticity adjustment apparatus 300 includes a RGB converter 301 for converting a YUV signal into an RGB signal, a selector 302 for selecting an input signal, a gamma correction unit 303, a chromaticity conversion unit 304 for adjusting the chromaticity of the three primary colors R, G, and B, an inverse gamma correction unit 305, a control unit 306, an operation unit 307, and an input port 308.

The image signal selected by the selector 302 is input to the gamma correction unit 303. As is the case with the gamma correction unit 611 shown in FIG. 3 or the gamma correction unit 203 shown in FIG. 8, the gamma correction unit 303 of the present embodiment is basically provided to correct, prior to the chromaticity conversion, the nonlinearity in the gradation reproduction of the image display apparatus that follows the gamma correction unit 303. However, the gamma correction unit 303 of the present embodiment contains a plurality of types of gradation conversion tables corresponding to standard image display apparatuses to be available for any kind of image display apparatus connected thereto. Upon notification, from the operation unit 307, of the type of an image display apparatus to be connected with, the gamma correction unit 303 receives an instruction from the control unit 308 to select a gradation conversion table corresponding to the image display apparatus, and performs a gamma correction.

With this construction, there is no need for preparing a chromaticity adjustment apparatus for each different type of image display apparatus. This proves to be economical, always providing an optimal chromaticity adjustment.

On the other hand, values for the parameters D1 to D9 are provided to the control unit 306 from the personal computer 130 via the input port 308. The control unit sets these parameter values in the matrix operation circuit in the chromaticity conversion unit 304, allowing the chromaticity for the three primary colors to be adjusted.

The inverse gamma correction unit 305 contains a plurality of inverse gradation conversion tables corresponding to the plurality of gradation conversion tables stored in the gamma correction unit 303. In accordance with an instruction from the control unit 306, the inverse gamma correction unit 305 selects an inverse gradation conversion table that corresponds to the gradation conversion table selected in the gamma correction unit 303.

The RGB signal on which the inverse gamma conversion has been performed is output to the image display apparatus connected to the chromaticity adjustment apparatus 300.

With the above construction of the present embodiment in which the chromaticity adjustment apparatus 300 is provided as a discrete device, all the user has to do to adjust the chromaticity of the display images is to connect the chromaticity adjustment apparatus 300 to somewhere between an already available image display apparatus and an image distribution apparatus and set parameters for them. This secures the color continuity of the displayed images.

Variations

Up to now, a few embodiments of the present invention have been described. However, the present invention is not limited to the above embodiments and can be varied as follows, for example.

1) In Embodiment 1, the personal computer 130 calculates the parameters D1 to D9. However, the image distribution apparatus 100 may have an operation unit for inputting the chromaticity and brightness values, and allow the control unit 72 to execute the flowchart shown in FIG. 7 based on the input values so that the above parameters can be obtained.

Similarly, the internal control unit in Embodiment 2 or 3 may calculate the parameters. In this case, the personal computer 130 is not required in setting the parameters for chromaticity adjustment, which is very convenient.

2) In the above embodiments, liquid crystal projectors are used as image display apparatuses. However, any display apparatuses may be used as the image display apparatuses so long as they can display images side by side. For example, (a) reflection type projectors using optical reflection type devices or (b) CRT type projectors that use enhanced CRT electron beams to project images formed on the front panel onto a screen placed forward of the front panel. Also, flat display panels like plasma display panels may be used as well.

INDUSTRIAL APPLICABILITY

As described above, the multidisplay apparatus of the present invention adjusts the chromaticity of the images displayed by the image display apparatuses separately for each of the three primary colors red, green, and blue. This enables the chromaticity values of the images to be substantially equal to each other, makes it possible for the viewer not to notice that a plurality of images side by side are displayed on a screen by a plurality of image display apparatuses. This invention is suitable for image display in a concert or an event that requires a large-sized and high-quality screen.

The invention claimed is:

1. An image signal processing apparatus for use as a preprocessing apparatus for an image display apparatus that displays images in accordance with color image signals, comprising:
   an image signal receiving means for receiving a color image signal;
   a gamma correction means for performing a gamma correction on the received color image signal to produce gamma corrected color image signal values; and
   a chromaticity adjustment means for performing a calculation using the gamma corrected color image signal values so as to adjust the chromaticity of an image to be displayed by the image display apparatus for each of primary colors red, green, and blue, separately.

2. The image signal processing apparatus of claim 1, wherein the chromaticity adjustment means includes:
   a matrix operation means for multiplying the signal values of the received color image signal with a determinant;
   a parameter receiving means for receiving a predetermined parameter; and
   a determinant changing means for changing the determinant in accordance with the received parameter, wherein
   the chromaticity adjustment means adjusts the chromaticity for each primary color by performing a calculation using the changed determinant.

3. The image signal processing apparatus of claim 1, wherein
   gradation conversion characteristics in the gamma correction means are substantially equal to gradation conversion characteristics required to correct gradation reproduction characteristics of a display device of the image display apparatus.

4. The image signal processing apparatus of claim 1 further comprising
   an inverse gamma correction means for performing an inverse gamma correction on the color image signal output from the chromaticity adjustment means.

5. The image signal processing apparatus of claim 1, wherein
   the received color image signal is a YUV signal,
   the image signal receiving means includes
   a signal conversion means for converting the received YUV signal into an RGB signal, and
   the chromaticity adjustment means adjusts the chromaticity for each primary color by performing a calculation on signal values of the RGB signal.

6. An image display apparatus, comprising:
   an image signal preprocessing means for preprocessing a color image signal; and
   an image display means for displaying images in accordance with the preprocessed color image signal, wherein
   the image signal preprocessing means includes
   an image signal receiving means for receiving the color image signal,
   a gamma correction means for performing a gamma correction on the received color image signal to produce gamma corrected color image signal values; and
   a chromaticity adjustment means for performing a calculation using the gamma corrected color image signal values so as to adjust the chromaticity of an image to be displayed by the image display apparatus for each of primary colors red, green, and blue, separately.

7. The image display apparatus of claim 6, wherein the chromaticity adjustment means includes:
   a matrix operation means for multiplying the signal values of the received color image signal with a determinant;
   a parameter receiving means for receiving a predetermined parameter; and
   a determinant changing means for changing the determinant in accordance with the received parameter, wherein
   the chromaticity adjustment means adjusts the chromaticity for each primary color by performing a calculation using the changed determinant.

8. The image display apparatus of claim 6, wherein
   gradation conversion characteristics in the gamma correction means are substantially equal to gradation conversion characteristics required to correct gradation reproduction characteristics of a display device of the image display apparatus.

9. The image display apparatus of claim 6, wherein
   the received color image signal is a YUV signal,
   the image signal receiving means includes
   a signal conversion means for converting the received YUV signal into an RGB signal, and
   the chromaticity adjustment means adjusts the chromaticity for each primary color by performing a calculation on signal values of the RGB signal.

10. A multidisplay apparatus for allowing a plurality of image display units to display a plurality of images side by side on a screen, comprising:
    an image distribution means for generating, from a received color image signal, a plurality of color image signals for a plurality of images to be displayed respectively by the plurality of image display units; and
    a plurality of chromaticity adjustment means which respectively correspond to the plurality of image display units and each performs a calculation using signal values of one of the plurality of color image signals to be input to a corresponding image display unit and adjusts the chromaticity to a target chromaticity level for each of the primary colors red, green, and blue of an image to be displayed by the corresponding image display unit, wherein
    the target chromaticity level for each primary color is set to a value in chromaticity coordinates that is among coordinate values belonging to a common chromaticity range which is common to ranges of chromaticity that can be displayed by the plurality of image display units, and is closest to a standard chromaticity coordinate value for each primary color.

11. The multidisplay apparatus of claim 10, wherein the chromaticity adjustment means includes:
    a matrix operation means for multiplying the signal values of the received color image signal with a determinant;
    a parameter receiving means for receiving a predetermined parameter; and
    a determinant changing means for changing the determinant in accordance with the received parameter, wherein
    the chromaticity adjustment means adjusts the chromaticity for each primary color by performing a calculation using the changed determinant.

12. The multidisplay apparatus of claim 10, wherein the chromaticity adjustment means includes
    a gamma correction means for performing a gamma correction on the color image signal, and the chromaticity adjustment means performs a calculation using signal values of the color image signal on which the gamma correction was performed.

13. The multidisplay apparatus of claim 12, wherein gradation conversion characteristics in the gamma correction means are substantially equal to gradation conversion characteristics required to correct gradation reproduction characteristics of a display device of the image display apparatus.

14. The multidisplay apparatus of claim 12 further comprising
an inverse gamma correction means for performing an inverse gamma correction on the color image signal output from the chromaticity adjustment means.

15. The multidisplay apparatus of claim 10, wherein
the received color image signal is a YUV signal,
the image signal receiving means includes
a signal conversion means for converting the received YUV signal into an RGB signal, and
the chromaticity adjustment means adjusts the chromaticity for each primary color by performing a calculation on signal values of the RGB signal.

16. A chromaticity adjustment method for adjusting the chromaticity of images displayed by a multidisplay apparatus that allows a plurality of image display units to display a plurality of images side by side on a screen, the multidisplay apparatus including a plurality of chromaticity adjustment means which respectively correspond to the plurality of image display units and each receive a parameter, perform a calculation using signal values of a color image signal in accordance with the received parameter, and adjust the chromaticity of an image to be displayed by a corresponding image display unit for each of primary colors red, green, and blue, separately, the chromaticity adjustment method comprising:
a first step for inputting an image signal to each image display unit for each of primary colors red, green, and blue, allowing each image display unit to display an image, and measuring the chromaticity and the brightness of the image displayed by each image display unit for each primary color; and
a second step for determining, in accordance with measured values of the chromaticity and the brightness, the parameters to be respectively input to the plurality of chromaticity adjustment means so that chromaticity values of the images displayed by the plurality of image display units are substantially equal to each other for each primary color, wherein
the second step includes:
a first sub-step for obtaining, from chromaticity values for each primary color, ranges of chromaticity that can be displayed by the plurality of image display units;
a second sub-step for obtaining a common chromaticity range which is common to the obtained ranges of chromaticity, and setting target chromaticity values for each of red, green, and blue out of values belonging to the common chromaticity range; and
a third sub-step for determining the parameters so that chromaticity values of the images displayed by the plurality of image display units are substantially equal to the target chromaticity values for each of red, green, and blue.

* * * * *